United States Patent [19]
Paull et al.

[11] 3,854,310
[45] Dec. 17, 1974

[54] ELECTRIC CONTROL MOTOR DRIVEN LOCK MECHANISM

[75] Inventors: Stephen Paull, Falls Church, Va.; Paul A. Crafton, Potomac, Md.

[73] Assignee: Constellation Corporation, Rockville, Md.

[22] Filed: Mar. 7, 1974

[21] Appl. No.: 449,134

Related U.S. Application Data

[60] Continuation of Ser. No. 216,132, Jan. 7, 1972, abandoned, Division of Ser. No. 84,085, Oct. 26, 1970, abandoned.

[52] U.S. Cl................... 70/280, 70/264, 70/279
[51] Int. Cl............................................. E05b 47/00
[58] Field of Search............ 70/280, 277, 279, 264; 318/287, 293; 74/626

[56] References Cited
UNITED STATES PATENTS

| | | | |
|---|---|---|---|
| 1,646,181 | 10/1927 | Babekuhl | 292/199 |
| 1,793,228 | 2/1931 | Hackethal | 74/626 |
| 2,913,655 | 11/1959 | O'Neill | 318/293 X |
| 3,064,172 | 11/1962 | Young et al. | 318/293 |
| 3,392,559 | 7/1968 | Hedin et al. | 70/277 |
| 3,785,187 | 1/1974 | Wolz | 70/264 |

*Primary Examiner*—Jordan Franklin
*Assistant Examiner*—Peter Nerbun
*Attorney, Agent, or Firm*—Sughrue, Rothwell, Mion, Zinn & Macpeak

[57] ABSTRACT

An electric control motor driven lock mechanism, for primary use with a door, in which a sector bolt is driven by an electric motor through a worm gear. The operation of the driving motor is controlled by a logic circuit having a plurality of inputs. The inputs to the logic circuit include not only an electronic combination or other operating signals, but also signals from limit switches which indicate that the door is fully opened, fully closed or that the motor is in the process of operating. The use of an irreversible worm/worm gear coupling prevents the sector bolt from driving the motor and therefore the sector bolt can only be opened when the motor is energized to open the bolt. In an alternate embodiment the worm drives the sector bolt through a differential gear. A manual drive is applied to a second input of the differential gear, thereby enabling the mechanism to be manually operated in the event of a power failure.

10 Claims, 9 Drawing Figures

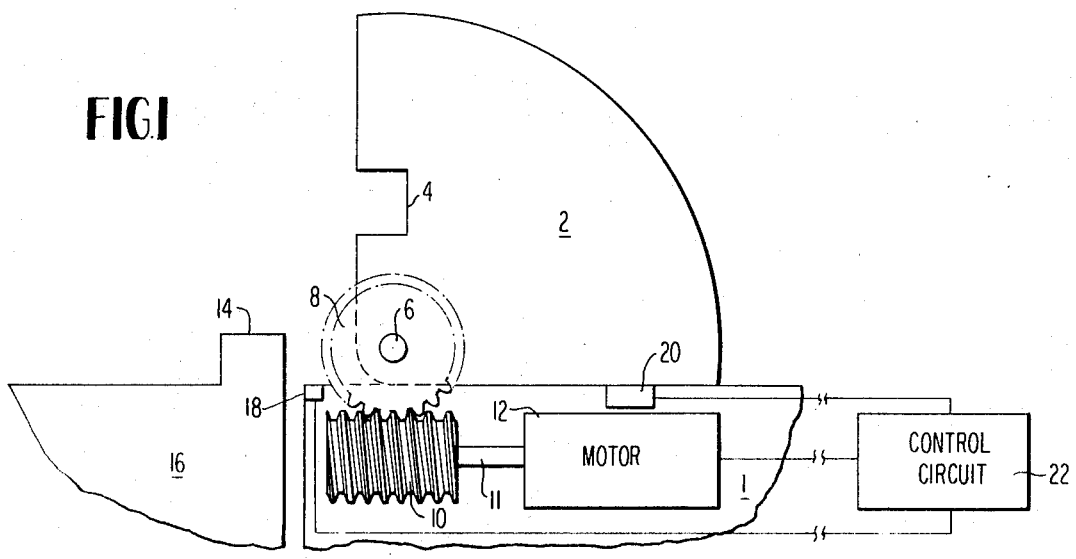
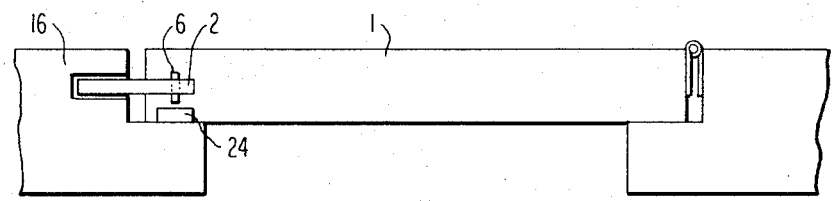
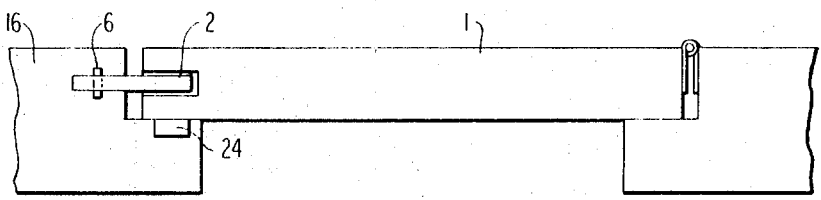
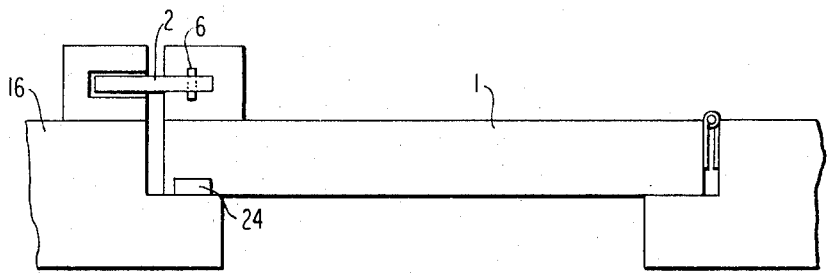

| MOTOR CONTROL CIRCUIT OPERATION |||||||||
|---|---|---|---|---|---|---|---|---|
| STATE | A | B | Q1 | Q2 | Q3 | Q4 | Q5 | Q6 | MOTOR |
| 1 | 0 | 0 | OFF | ON | OFF | OFF | ON | OFF | STOP |
| 2 | 0 | 1 | OFF | ON | OFF | ON | OFF | ON | ON FWD TO LOCK |
| 3 | 1 | 0 | ON | OFF | ON | OFF | ON | OFF | ON REV TO UNLOCK |
| 4 | 1 | 1 | ON | OFF | ON | ON | OFF | ON | STOP |

ELECTRIC CONTROL MOTOR DRIVEN LOCK MECHANISM

The instant application for Electrical Control Motor Driven Lock Mechanism, by Stephen Paull, et al. is a continuation of Ser. No. 216,132, filed Jan. 7, 1972, now abandoned, which application is a continuation-in-part of Ser. No. 84,085, filed Oct. 26, 1970, now abandoned.

BACKGROUND OF THE INVENTION

1. Field of the Invention

This invention relates to an electric lock and more particularly to a sector bolt lock mechanism which is operated by a motor through a worm gear coupling wherein the motor is operated by the output from an electronic logic circuit. Mechanical means are also provided for operating the mechanism in case of power failure.

2. Description of the Prior Art

Prior art locking devices are often ineffective to maintain a door in closed position because it is possible to operate the lock without the use of a key or knowing the combination. One method of operating a lock wihtout a key is to use some means for operating the tumblers. This renders the lock totally ineffective. In prior art motor driven locks it is often possible to force the lock by managing to force the bolt in the reverse direction. When the force is applied to the bolt it merely forces the rotor of a motor to move in the reverse direction. These disadvantages found in the prior art locks are overcome by the instant invention.

SUMMARY OF THE INVENTION

This invention relates to a lock bolt mechanism which is motor driven and the control circuit for operating the motor drive. The actual mechanism which comprises a sector bolt coupled to a motor by two worm gears can be inserted in a door, in a door frame, or outside of the door on the interior side thereof. The motor, when operated by the control circuit, drives a worm which in turn drives a worm gear which is kinematically part of a rotating sector bolt. The use of irreversible worm gears prevents the sector bolt from driving the motor and therefore, the sector bolt can be opened only when the motor is energized to open the bolt. The control circuit for the motor comprises an electronic logic circuit with a plurality of inputs. These inputs include a command signal which normally operates the lock mechanism and signals from limit switches indicating whether the door is in an open position or a closed position. Also, the control circuit has provisions for disabling the command signal input by operation of a disable switch.

In an alternate embodiment the motor driven worm is coupled to the sector bolt through a differential gear. The second input to the differential gear is supplied through a mechanically driven worm, thus enabling manual operation of the lock mechanism from the inside of the door in the event of a power failure or other emergency.

It is therefore the primary object of this invention to provide an electrically controlled motor operated lock mechanism.

It is another object of this invention to provide a motor driven lock mechanism which uses worm gears to couple a sector bolt to a motor such that the sector bolt can only be operated by the motor and cannot be forced open by hand. It is still another object of this invention to provide a motor operated lock mechanism which is controlled by an electronic logic circuit.

It is a further object of this invention to provide a logic circuit for operating a motor driven lock mechanism in which the logic circuit is operated by a command signal.

It is a further object of this invention to provide an electric motor driven lock mechanism which incorporates an alternate manual drive in the case of an emergency.

BRIEF DESCRIPTION OF THE DRAWINGS

FIG. 1 is a diagram of the preferred embodiment of the motor driven lock mechanism of this invention.

FIG. 2a is a diagram of the lock mechanism mounted on a door.

FIG. 2b is a diagram of a lock mechanism mounted in a door frame.

FIG. 2c is a diagram of a lock mechanism mounted on the interior side of the door.

Referring now to FIG. 1, the lock mechanism comprises a sector bolt 2 having a notch 4 which is rotatable about axis 6. Worm gear 8 is attached to sector bolt 2 about axis 6. Worm gear 8 is driven by worm 10 which is driven by the shaft 11 of motor 12. Worm gear 8 and worm 10 are irreversible thereby preventing the sector bolt 2 from driving motor 12. In this manner sector bolt 2 can only be opened by the operation of motor 12 and it cannot be manually forced open.

Figures 3, 4:
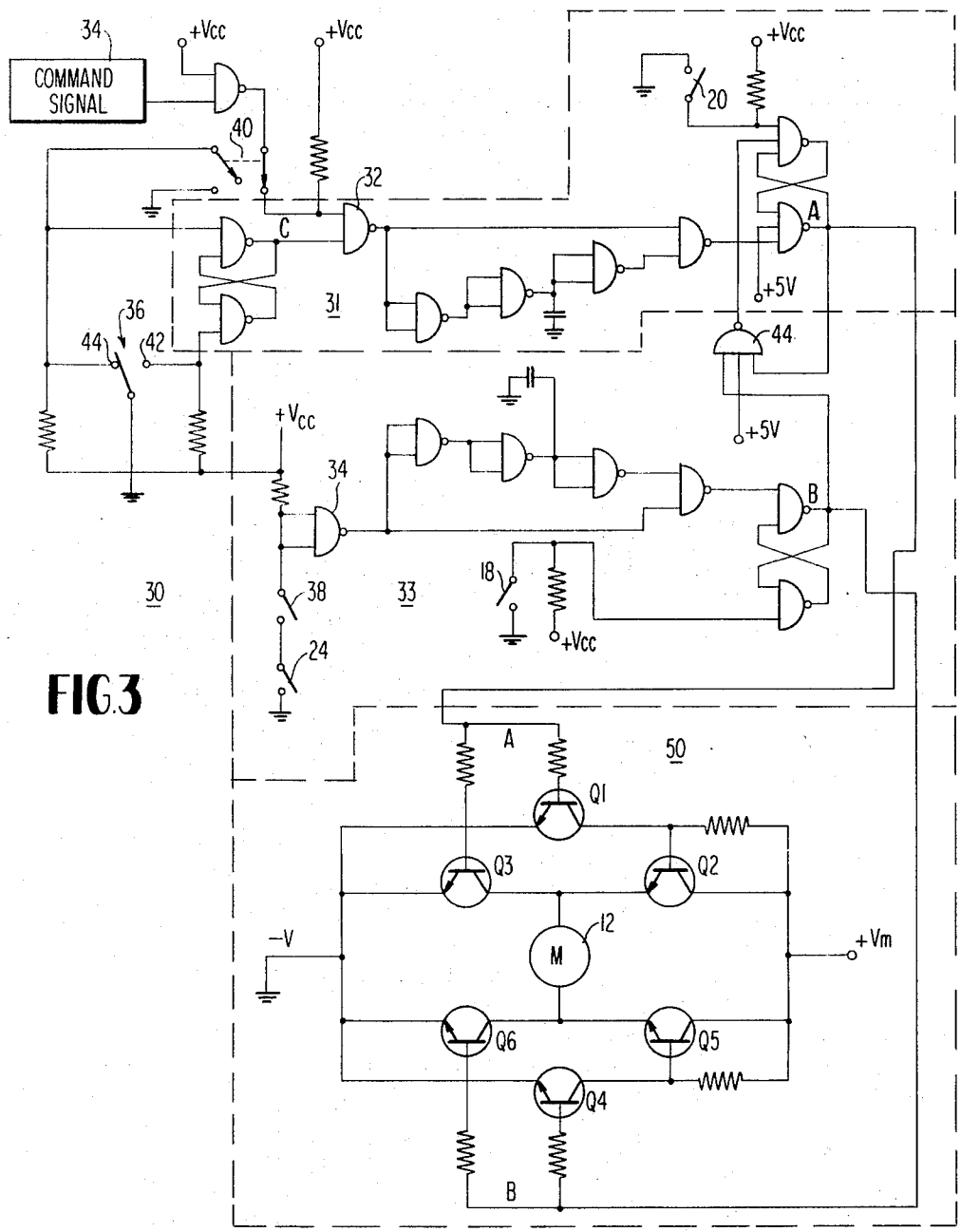
FIG. 3 is a circuit diagram of the logic circuit for operating the motor of the preferred embodiment of this invention.
FIG. 4 is a table setting forth the motor control circuit operation.

When sector bolt 2 is rotated to its locked position (not shown) recess 4 is aligned with notch 14 of door frame 16. This arrangement prevents the sector bolt 2 from being forced away from the door frame. It can be seen therefore, that the lock mechanism of this invention is constructed such that the sector bolt can neither be rotated manually because of the irreversible worm gears nor forced laterally because of the interlocking of notch 14 and recess 4. Normally open limit switch 20 is affixed to door 1 such that it is closed when sector bolt 2 is in the fully unlocked position as shown in FIG. 1. Limit switch 20 is connected to control circuit 22 which controls motor 12. Normally open limit switch 18 is affixed to door 1 and is held in the closed position when sector bolt 2 is in the fully locked position.

FIG. 2a shows the manner in which the lock mechanism of FIG. 1 is mounted on door 1. Normally open limit switch 24 is mounted on door 1 and is closed when door 1 is in a fully closed position.

FIG. 2b shows the manner in which the lock mechanism of FIG. 1 is mounted on door frame 16. The only difference between this embodiment and the embodiment of FIG. 2a is that notch 14 would be located on door 1 rather than on door frame 16 and limit switch 24 is located on door frame 16 and is closed when door 1 is in the fully closed position.

FIG. 2c shows a third manner in which the lock mechanism of FIG. 1 can be mounted. The lock mechanism is mounted on the interior side of door frame 1 and limit switch 24 is mounted on door 1 and is closed when door 1 is in the fully closed position.

Referring now to FIGS. 3 and 4 the control circuit 22 is divided into two portions: logic circuit 30 and motor current control circuit 50. Motor current control circuit 50 comprises transistor Q-1 through Q-6, a DC motor supply $V_m$ and motor 12. Logic circuit 30 has two outputs, A and B, the combination of which operates different combinations of transistors Q-1 through Q-6 thereby controlling the operation of motor 12. This is shown in the table of FIG. 4.

The logic portion 30 of control logic circuit 22 comprises a command signal circuit 34, an interior unlock switch 36, a night latch switch 40, an unlock trigger circuit 31 and a lock trigger circuit 33. Unlock trigger circuit 31 includes a plurality of AND gates with inverted outputs 32 and limit switch 20. Lock trigger circuit 33 includes a plurality of AND gates with inverted outputs 35, limit switches 18 and 24 and interior lock switch 38.

When door 1 is fully closed and sector bolt 2 is in the fully locked position, limit switch 18 is closed thereby clamping output B of logic circuit 30 to 0. Interior unlock switch 36 is in the position as shown in FIG. 3 thereby clamping point C to logic 1. The output of command signal circuit 34 is normally at logic 0. Night latch switch 40 is used to disconnect command signal circuit 34 from logic circuit 30. By disconnecting command signal circuit 30 unlock trigger circuit 31 cannot be operated by command signal circuit 34. This feature is useful at night when someone on the interior side of the door wants to prevent someone on the exterior side from entering even when the person on the exterior side can operate the command signal circuit 34.

To unlock door 1, either unlock switch 36 located on the interior side of the door is moved to the right to ground contact 42 or command signal circuit 34 is actuated thereby producing a logic 1. In either case, unlock trigger circuit 31 of logic circuit 30 operates to produce an output A equal to logic 1. Output B is held at logic 0 and therefore, as shown in FIG. 4, the motor 22 operates in the reverse direction to move sector bolt 2 to the unlock position. Further operation of command signal circuit 34 or interior unlock switch 36 will have no effect on motor 12, because when the sector bolt 2 is in the fully unlocked position limit switch 20 is closed thereby clamping output A to logic 0.

If door 1 is then opened, limit switch 24 is opened preventing any further operation of motor 12.

To lock the door, door 1 is closed, thereby closing limit switch 24. Interior lock switch 38 is closed thereby producing in lock trigger circuit 33 an output B of logic 1. This drives motor 12 in the forward direction thereby driving sector bolt 2 to the lock position. When sector bolt 2 reaches the fully locked position it closes limit switch 18 thereby switching output B of lock trigger circuit 33 to logic 0, thereby stopping motor 12.

Inhibit gate 44 causes motor 12 to operate in the forward direction if command signal circuit 34 or unlock switch 36 are operated while the motor is operating in the forward direction or if lock switch 38 is operated while the motor is operating in the reverse direction. In either of these cases the sector bolt 2 will be driven to the locked position.

If interior lock switch 38 is kept closed, the sector bolt 2 will automatically be driven to the locked position upon the closing of the door, and thus "snap action" locking takes place upon the closing of the door. If interior lock switch 38 is kept open, the sector bolt 2 will not automatically be driven to the locked position upon the closing of the door. Interior lock switch 38 is therefore used as a selector switch to include or exclude automatic "snap action" locking upon the closing of the door. If the door is closed while interior lock switch 38 is open, no "snap action" locking will result, but the door can be subsequently locked from the inside by closing interior lock switch 38.

Figure 5:
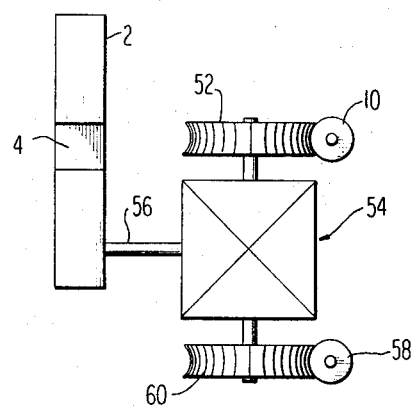
FIG. 5 is a mechanical schematic diagram showing an alternate embodiment of the invention incorporating a manual drive.

In the alternate embodiment shown in FIG. 5 the motor driven worm 10 drives worm gear 52 which in turn is coupled to one input of a differential gear 54. The output shaft 56 of the differential gear is coupled directly to sector bolt 2. A second input to the differential gear is supplied by a manually driven worm 58 through worm gear 60. With this arrangement the sector bolt 2 may be electrically operated by motor driven worm 10, as previously described, and it may also be operated by manually rotating worm 58. This provision for alternate manual operation is required in many installations by the Underwriters Laboratory as a safety feature in the event of an electrical power failure or other emergency.

The manual drive means would, of course, be located on the inside of the door. It in no way affects the electrical operation since worm 58 cannot be reverse driven by worm gear 60, and therefore the second, manual input to the differential gear is essentially "locked" when not in use.

Figure 6:
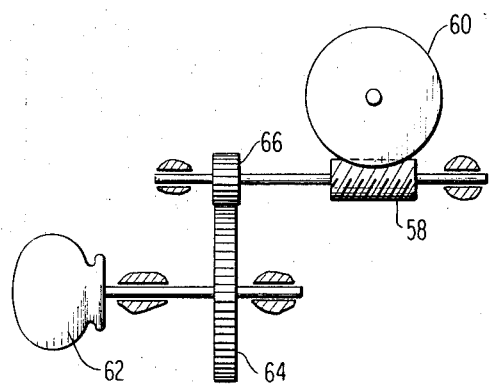
FIG. 6 is mechanical schematic diagram showing the manual drive coupled to a door knob.
Figure 7:
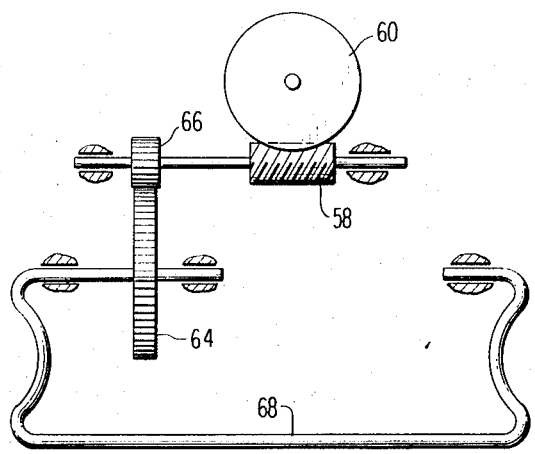
FIG. 7 is a mechanical schematic diagram showing the manual drive coupled to a door bar.

FIG. 6 schematically shows one type of manual drive arrangement wherein a door knob 62 is coupled through gears 64,66 to worm 58 which in turn drives worm gear 60. FIG. 7 shows a further, similar arrangement in which the door knob 62 is replaced by a horizontal door bar 68 of the type commonly found on exit doors in commercial buildings.

While the invention has been particularly shown and described with reference to preferred embodiment thereof, it will be understood by those skilled in the art that various changes in form and details may be made therein without departing from the spirit and scope of the invention.

What is claimed is:

1. An electrically controlled motor driven lock mechanism, comprising:
  a. a sector bolt rotatable between a locked and an unlocked position,
  b. a reversible electric motor having a shaft,
  c. a worm connected to the motor shaft,
  d. a worm gear driven by the worm and connected to the sector bolt, wherein the gear ratio between the worm and worm gear is such that the worm will only rotate when a rotative force is applied to the motor shaft,
  e. a door, wherein said sector bolt is mounted on said door,
  f. a door frame for receiving said door, said door frame having a notch means thereon, g. said sector bolt having a recess means thereon such that when said sector bolt is in a locked position said recess means receives said notch means, h. a motor current control circuit means for controlling the direction of current through said motor and thereby the direction of rotation of the shaft of said motor;

i. a first logic circuit means having a plurality of AND gates with inverted outputs for generating a first output, said first ouptut being applied to said motor current control circuit means, whereby when said first logic circuit means generates an output said motor current control circuit means causes the rotation of said motor shaft in a direction to cause said sector bolt to rotate to said unlocked position;

j. a second logic circuit means having a plurality of AND gates, with inverted outputs for generating a second output, said second output being applied to said motor current control circuit means, whereby when said second logic cirucit means generates an output, said motor current control circuit means causes the rotation of said motor shaft in a direction to cause said sector bolt to rotate to said locked position;

k. a first sensing means for sensing when said sector bolt is in said unlocked position and for preventing said first logic circuit from generating an output when said unlocked position is sensed;

l. a second sensing means for sensing when said sector bolt is in said locked position and for preventing said second logic circuit from generating an output when said sector bolt is in said locked position and, m. a third sensing means for sensing when said door is not received in said door frame and for preventing said second logic circuit means from generating an output when said door is not received in said door frame.

2. The apparatus of claim 1 wherein said motor current circuit control means further comprises:

a. a command signal circuit means for generating an output, said output being applied to said first logic circuit means whereby said first logic circuit means will generate an output when said output from said command signal circuit means is applied thereto;

b. an interior unlock switch means for causing said first logic circuit means to generate an output; and c. an interior lock switch means for causing said second logic circuit means to generate an output.

3. The apparatus of claim 2 wherein said interior lock switch means comprises a switch having a first and second position whereby when in said first position said second logic circuit means will generate an output when said door is received in said frame and when in said second position said second logic circuit means will be prohibited from generating an output when said door is received in said frame; said switch thereby acting as a dead bolt on said door to lock said door when said door is received in said frame.

4. The mechanism claimed in claim 1 wherein the worm gear is connected to the sector bolt through a differential gear, and further comprising manually operable means for driving the differential gear.

5. The mechanism claimed in claim 4 wherein the manually operable means comprises a manually driven worm, and a worm gear driven by the worm and coupled to the differential gear.

6. An electrically controlled motor driven lock mechanism, comprising:

a. a sector bolt rotatable between a locked and an unlocked position, b. a reversible electric motor having a shaft, c. a worm connected to the motor shaft, d. a worm gear driven by the worm and connected to the sector bolt, wherein the gear ratio between the worm and worm gear is such that the worm will only rotate when a rotative force is applied to the motor shaft, e. a door frame, wherein said sector bolt is mounted on said door frame, f. a door, fitted to be received by said door frame, said door having a notch thereon, and g. said sector bolt having a recess means thereon such that when said sector bolt is in a locked position said recess means receives said notch means, h. a motor current control circuit means for controlling the direction of current through said motor and thereby the direction of rotation of the shaft of said motor;

i. a first logic circuit means having a plurality of AND gates with inverted outputs for generating a first output being applied to said motor current control circuit means, whereby when said first logic circuit means generates an output said motor current control circuit means causes the rotation of said motor shaft in a direction to cause said sector bolt to rotate to said unlocked position;

j. a second logic circuit means having a plurality of AND gates with inverted outputs for generating a second output, said second output being applied to said motor current control circuit means, whereby when said second logic circuit means generates an output, said motor current control circuit means causes the rotation of said motor shaft in a direction to cause said sector bolt to rotate to said locked position, k. a first sensing means for sensing when said sector bolt is in said unlocked position and for preventing said first logic circuit from generating an output when said unlocked position is sensed;

l. a second sensing means for sensing when said sector bolt is in said locked position and for preventing said second logic circuit from generating an output when said sector bolt is in said locked position and, m. a third sensing means for sensing when said door is not received in said door frame and for preventing said second logic circuit means from generating an output when said door is not received in said door frame.

7. The apparatus of claim 6 wherein said motor current circuit control means further comprises:

a. a command signal circuit means for generating an output, said output being applied to said first circuit means whereby said first logic circuit means will generate an output when said output from said command signal circuit means is applied thereto;

b. an interior unlock switch means for causing said first logic circuit means to generate an output; and c. an interior lock switch means for causing said second logic circuit means to generate an output.

8. The apparatus fo claim 6 wherein said interior lock switch means comprises a switch having a first and second position whereby when in said first position said second logic circuit means will generate an output when said door is received in said frame and when in said second position said second logic circuit means will be prohibited from generating an output when said door is received in said frame; said switch thereby acting as a dead bolt on said door to lock said door when said door is received in said frame.

9. The mechanism claimed in claim 6 wherein the worm gear is connected to the sector bolt through a differential gear, and further comprising manually operable means for driving the differential gear.

10. The mechanism claimed in claim 6 wherein the manually operable means comprises a manually driven worm, and a worm gear driven by the worm and coupled to the differential gear.

* * * * *